United States Patent

[11] 3,602,247

[72] Inventors Stuart E. Bunn;
Herbert B. Owsley, both of P. O. Box 388,
Shawnee Mission, Kans.
[21] Appl. No. 875,431
[22] Filed Nov. 10, 1969
[45] Patented Aug. 31, 1971

[54] MULTIPLE-POPPET VALVE STRUCTURE
11 Claims, 10 Drawing Figs.
[52] U.S. Cl. ............................................. 137/270,
137/512.1, 137/514.5, 417/536
[51] Int. Cl. .............................................. F16k 15/06
[50] Field of Search ........................................ 137/270,
270.5, 271, 269, 269.5, 512.1, 512, 514.5, 513.3,
513.5, 513.7, 514.7, 516.11, 516.15; 417/568, 536

[56] References Cited
UNITED STATES PATENTS

| Re. 11,767 | 8/1899 | Lash | 251/55 X |
| Re. 14,943 | 8/1920 | Jackson | 137/512.1 |
| 366,244 | 7/1887 | Pelletier | 137/525.5 |
| 520,150 | 5/1894 | Turner | 137/525.3 X |
| 649,089 | 5/1900 | Watson | 251/55 X |
| 949,208 | 2/1910 | Ballard | 137/514.7 |
| 1,502,736 | 7/1924 | Mercer | 137/514.5 |
| 2,011,304 | 8/1935 | Sharp | 417/536 |
| 2,094,951 | 10/1937 | Kowan | 137/514.7 X |
| 2,243,711 | 5/1941 | Lamb | 137/514.7 X |
| 3,124,152 | 3/1964 | Payne | 137/512.1 X |

Primary Examiner—M. Cary Nelson
Assistant Examiner—Robert J. Miller
Attorney—Fishburn, Gold and Litman ABSTRACT: A valve assembly for controlling flow of fluid under pressure through a portion of a fluid-moving structure is formed of a plurality of elements adapted to be arranged to form either an intake or an exhaust valve assembly and to form single- or multiple-deck valve assemblies. The valve assembly includes one or more decks each having a seat member and a cage member with a plurality of valve member resiliently mounted therebetween to open and close fluid flow passages through said respective deck in response to differential pressure. The cage members each have a guide bore for each valve member and a vent passage through the cage member for each guide bore and a wafer valve member is mounted within each guide bore at the vent passage for cushioning movement of the respective valve member and for effecting positive seating thereof. In multiple-deck valve assemblies a spacer member is mounted between and in engagement with facing surfaces of adjacent decks for controlling the direction of flow of fluid through the assembly.

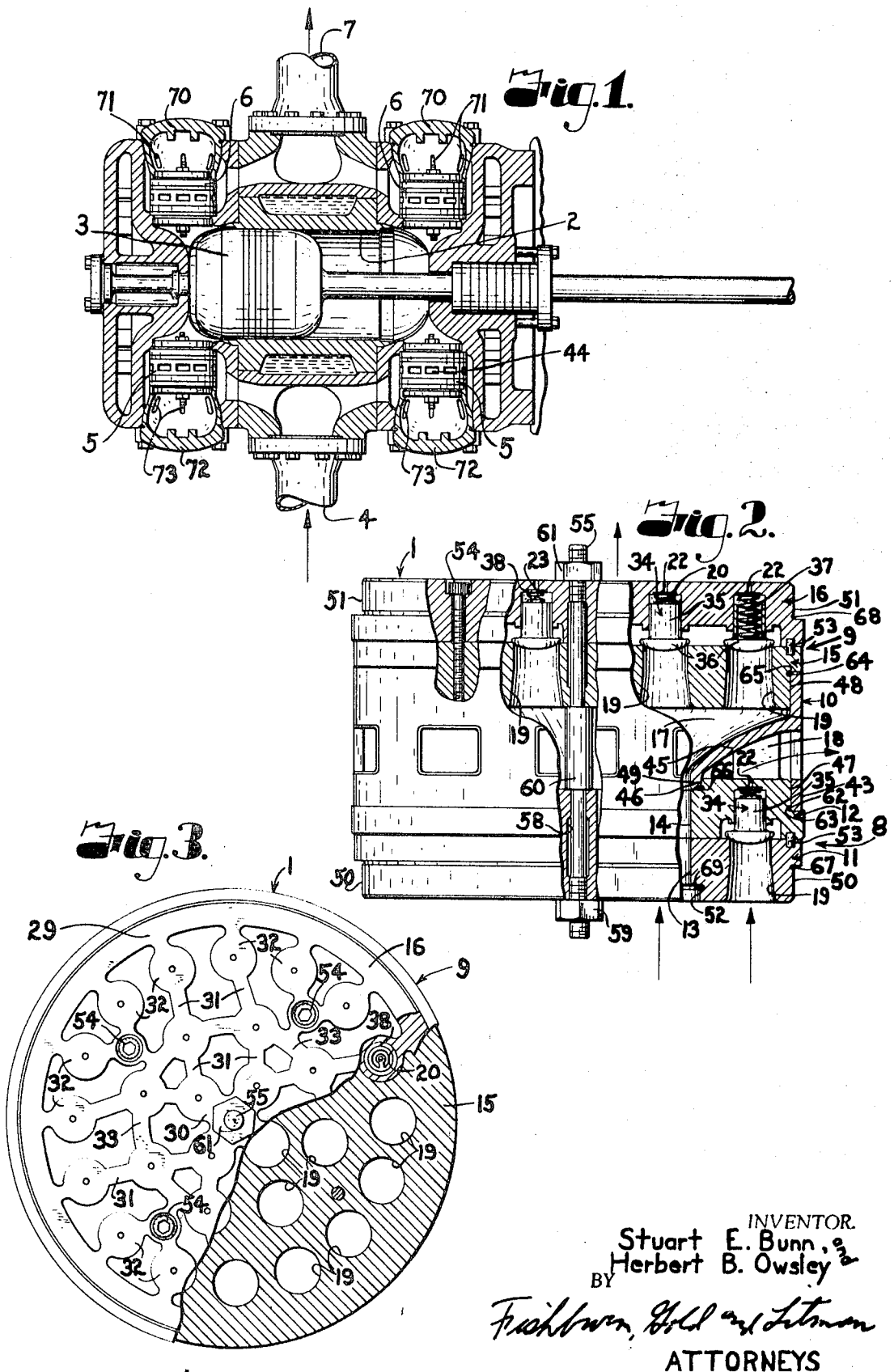

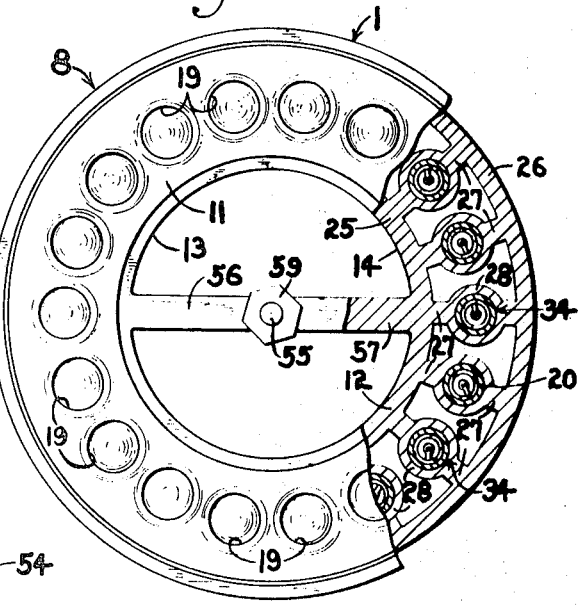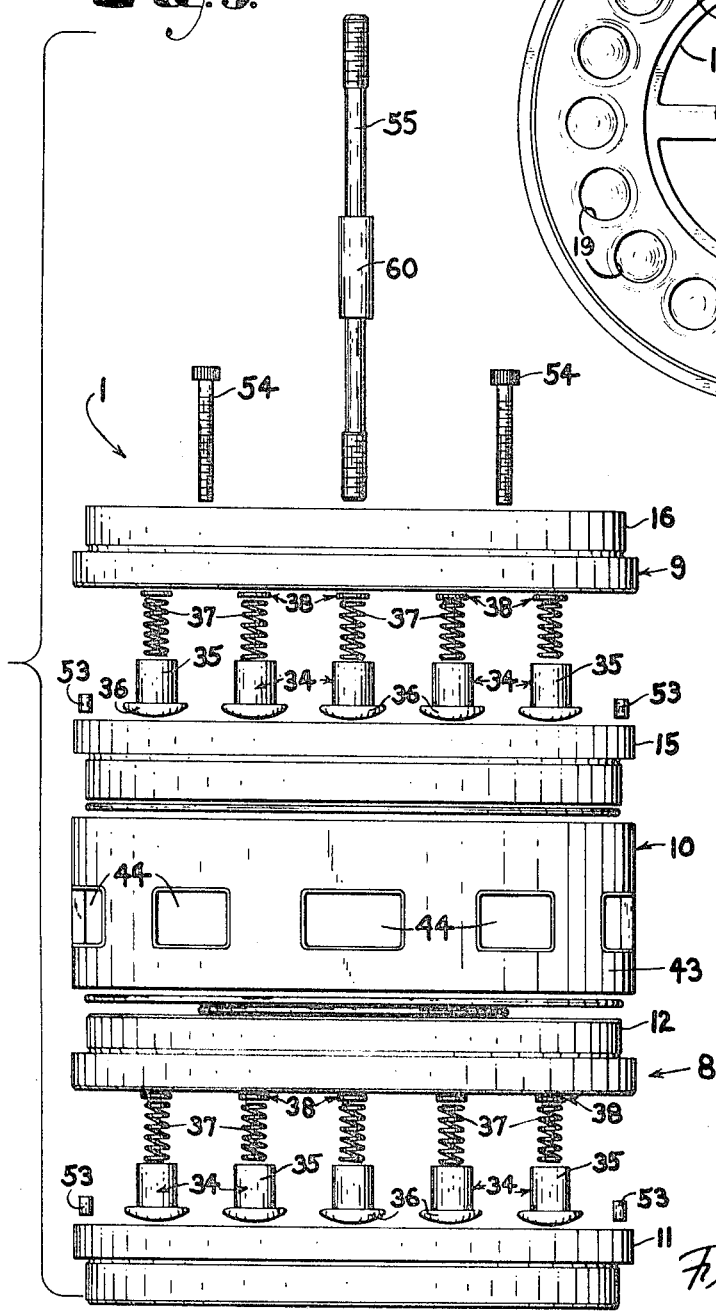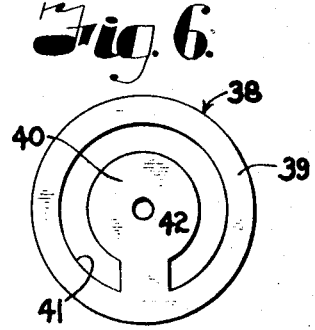

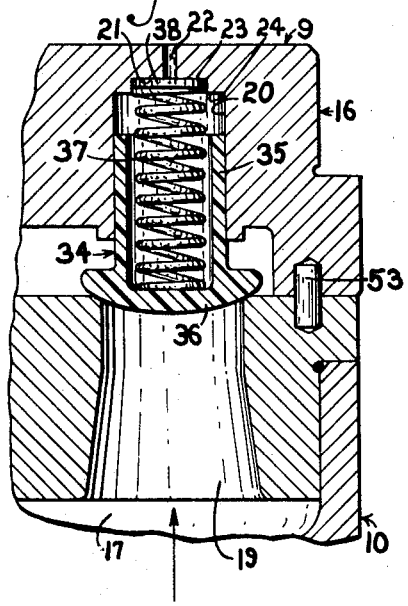
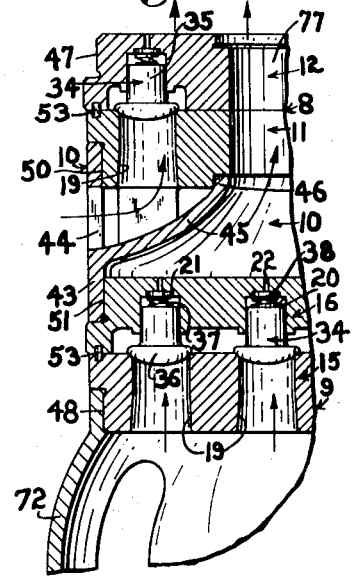
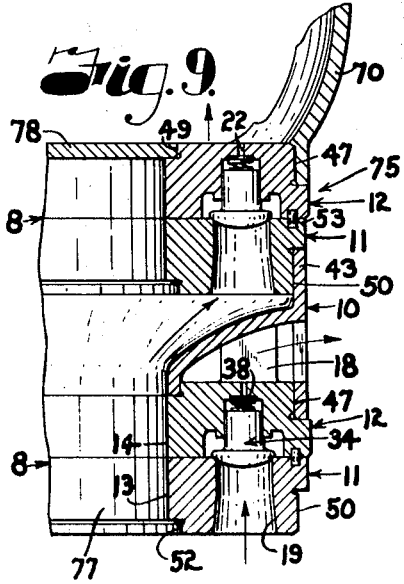
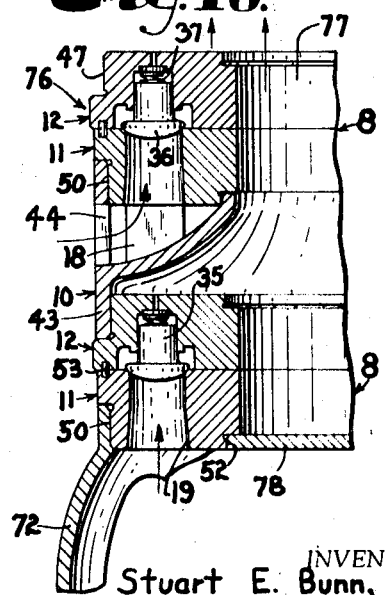

3,602,247

MULTIPLE-POPPET VALVE STRUCTURE

The present invention relates to valve assemblies for controlling flow of fluid under pressure through fluid-moving structures and more particularly to valve assemblies having multiple poppet valves therein for controlling unidirectional flow of fluid under pressure through fluid-moving structures, such as pumps, compressors, and the like.

The principal objects of the present invention are: to provide valve assemblies having a plurality of valve members with parts selectively assembled for variation in capacity; to provide such valve assemblies having seat members and cage members positioned in sets which may be stacked to selectively form a single-deck, deck-and-a-half, and double-deck valve assemblies; to provide such a valve assembly wherein the valve members therein are of the poppet type and the seat and cage members and the valve members are usable to form the different combinations so the necessary inventory of parts is relatively small to fill orders for the different valve assemblies; to provide a valve assembly formed of a plurality of interchangeable parts for controlling unidirectional flow of fluids under pressure in fluid-moving structures, such as pumps, compressors, and the like wherein the valve assembly has a large port area to reduce resistance to flow and increase capacity; to provide such a valve assembly having a plurality of decks in stacked relation with each deck having a large proportion thereof for flow of fluid therethrough; to provide such a valve assembly wherein a portion of the flow passes through valve-controlled flow passages in one deck and the remainder of the flow passes through valve-controlled flow passages in a second deck and combines with the flow from the first deck; to provide such a valve assembly with parts adapted to be relatively arranged whereby the assembly functions as a discharge valve or an intake valve; to provide such a valve assembly wherein movement of poppet valve members therein is cushioned and positive seating thereof is accomplished by resilient means; to provide such a valve assembly wherein the valve members open quickly, afford large port area, ans seat tightly and quickly; to provide such a valve assembly having light and strong moving parts to avoid inertia effects and vacuum hangups and to resist substantial operating pressures; and to provide such a valve assembly which is versatile in the combination of decks, economical to manufacture, easily maintained and installed, and positive in operation and particularly well adapted for the proposed use. Other objects and advantages of this invention will become apparent from the following description taken in connection with the accompanying drawings wherein are set forth by way of illustration and example certain embodiments of this invention.

FIG. 1 is a transverse sectional view through a fluid-moving structure having valve assemblies therein embodying features of the present invention.

FIG. 2 is an enlarged side elevational view of one of the valve assemblies with portions broken away to better illustrate the component parts, said parts being arranged as a discharge valve.

FIG. 3 is an enlarged plan view of a discharge deck of the valve assembly with portions broken away.

FIG. 4 is an enlarged plan view of an intake deck of the valve assembly with portions broken away.

FIG. 5 is an enlarged exploded side elevational view of the valve assembly.

FIG. 6 is a further enlarged plan view of a wafer valve for each valve cage in each deck of the valve.

FIG. 7 is an enlarged fragmentary transverse sectional view of the valve assembly having the component parts arranged as an intake valve.

FIG. 7 is a further enlarged fragmentary sectional view showing the mounting of a wafer valve in the valve cage.

FIG. 9 is a fragmentary transverse sectional view through a fluid-moving structure having a modified valve assembly therein.

FIG. 10 is an enlarged longitudinal sectional view through the modified valve assembly. Referring more in detail to the drawing:

The reference numeral 1 generally designates a fluid-moving structure, such as a compressor cylinder having a bore 2 within which a piston 3 reciprocates to compress a fluid received from an intake passage 4 through a plurality of intake valves 5. Fluid within the cylinder bore 2 is compressed by the piston 3 and forced through a plurality of discharge valves 6 into a discharge passage 7 for flow to a point of storage or use (not shown). The intake valves 5 and the discharge valves 6 are each mounted in respective flow passages 4 and 7 for unidirectional flow of fluid under pressure therethrough, such as produced by the piston 3 on intake and discharge strokes respectively.

Each valve assembly for controlling flow of fluid under pressure through a portion of a fluid moving structure 1 is formed of a plurality of elements adapted to be arranged to form either an intake valve assembly 5 or an exhaust or discharge valve assembly 6 and to form single or multiple-deck valve assemblies. The valve assembly includes one or more decks each having a seat member and a cage member with a plurality of movable valve members resiliently mounted therebetween to open and close fluid-flow passages through said respective deck in response to differential pressure.

The component parts of the intake valves 5 and the discharge valves 6 are interchangeable and each valve structure 5 and 6 has a first deck 8 positioned in spaced or stacked relation from a second deck 9 by a spacer member 10. FIGS. 2 to 5 inclusive illustrate the arrangement of the component parts for a discharge valve 6 and FIG. 7 illustrates the arrangement of the component parts for an intake valve 5.

The first deck 8 has a valve seat member 11 and a valve cage member 12 each having a central bore 13 and 14 respectively therethrough. The first deck 8 has a plurality of fluid flow passages therethrough, as later described, and arranged around the central bores 13 and 14 for flow of fluid into the respective valve assembly. The second deck 9 has a valve seat member 15 and a valve cage member 16 and the second deck 9 has a plurality of fluid-flow passages therethrough, as later described.

The spacer member 10 is adapted to position the first and second decks 8 and 9 in stacked or spaced-apart relation and to control the direction of flow of fluid through the first and second decks 8 and 9. In the illustrated structure, the spacer member 10 is shaped to be mounted between the first deck 8 and the second deck 9 and is shaped to form an interior passage 17 and an exterior passage 18. The passage 17 communicates the central bores 13 and 14 of the first deck 8 with the fluid-flow passages through the second deck 9 and the exterior passage 18 communicates the fluid-flow passages of the first deck 8 with the respective intake or discharge passage 4 or 7 of the fluid-moving structure 1.

It is noted that the second deck 9 does not have a central bore therethrough, therefore, a portion of the fluid flowing through the valve assembly flows through the central bore in the first deck 8 and into the interior passage 17 and through the fluid-flow passages through the second deck 9. The remaining portion of the fluid flowing through the valve assembly flows through the fluid-flow passages in the first deck and into the exterior passage 18 and into the respective intake or discharge passage 4 or 7 of the fluid-moving structure 1.

In the illustrated structure, each valve seat member 11 and 15 has a plurality of unimpeded fluid-flow passages therethrough in the form of circular ports 19 therethrough. Each of the fluid flow passages 19 has a mouth at one face of the respective seat member 11 and 15 to define a valve seat for valve members, as later described. Each of the valve cage members 12 and 16 have a guide bore in the form of a cylindrical recess 20 aligned with each of the circular ports 19. Each of the cylindrical recesses 20 has a bottom surface 21 in facing relation with the respective circular port 19. A vent passage in the form of a bore 22 extends through the respective valve cage member 12 or 16 and has one end thereof communicating with the bottom surface 21 of the cylindrical recess 20. The bore or vent passage 22 communicates with a counterbore 23 in the bottom surface 21 and the cylindrical recess 20 is illustrated as a further enlarged counterbore to form a shoulder 24.

While the circular ports 19 through the respective valve seat and the cylindrical recesses 20 through the respective valve cage, may be arranged in suitable pattern in the first and second decks 8 and 9, the ports 10 and recesses or guide bores 20 in the first deck 8 are circumferentially spaced around the central bores 13 and 14 and are in a concentric ring therearound. The ports 19 and recesses or guide bores 20 in the second deck 9 are circumferentially spaced in each of a plurality of concentric rings.

As best seen in FIG. 4, the valve cage member 12 of the first deck 8 is a planar member having radially spaced inner and outer rings 25 and 26 with a plurality of circumferentially spaced radially extending ribs 27 therebetween. Each rib 27 has a generally cylindrical enlarged member or portion 28 intermediate the ends thereof with a cylindrical recess or guide bore 20 therein.

As best seen in FIG. 3, the valve cage member 16 of the second deck 9 is a planar member having an outer ring 29 and a center portion 30 with a plurality of ribs 31 extending therebetween. Each of the ribs 31 has a plurality of enlarged cylindrical portions 32 therein with each enlarged portion 32 having a cylindrical recess or guide bore 20 therein. In the illustrated structure, the enlarged cylindrical portions 32 are arranged in a plurality of concentric rings and an annular rib 33 connects the enlarged cylindrical portions 32 in one of the concentric rings to thereby stiffen the valve cage member 16.

Valve members are mounted in each of the cylindrical recesses or guide bores 20 of the first and second decks 8 and 9 for controlling flow of fluid under pressure therethrough. In the illustrated structure, the valve members each include a poppet valve member 34 having a tubular stem portion 35 movable within the respective guide bore or cylindrical recess 20 and an enlarged head portion 36 of the poppet valve member 34 movable toward and away from the respective port 19 controlled thereby to close and open same respectively. The head portion 36 and the end of the respective port 19 are shaped to effect positive seating of the valve member 34 on the respective valve seat member 11 or 15. When the head portion 36 is spaced from the respective valve seat member 11 or 15, fluid flows through the valve cage member 12 or 16 by flowing between the ribs therein.

The valve members also include suitable resilient means, such as an elongate helical spring 37, sleeved within the tubular stem portion 35 of the respective poppet valve member 34 and having one end thereof bottomed within the respective guide bore or cylindrical recess 20, for urging the head portion 36 into positive seating engagement with the respective valve seat to close the circular port 19 therein. When the head portion 36 engages the respective valve seat in the seat members 11 or 15, thereby closing the respective port 19, there will be no fluid flow through the respective valve cage member 12 or 16 of the respective deck 8 or 9.

It is desirable to cushion the movement of the poppet valve members 34 and to effect positive seating of the head portion 36 on the valve seat of the respective port 19. Therefore, a wafer valve member 38 is mounted within the counterbore 23 of the cylindrical recess or guide bore 20 and has a passage therethrough aligned with the respective vent passage or bore 22.

In the illustrated structure, the wafer valve member 38 is a planar member and has an annular outer ring 39 sized to be mounted in the counterbore 23 and to be engaged by one end of the spring 37. A movable portion 40 extends into the space defined by the outer ring 39 from an inner peripheral edge 41 thereof. The movable portion 40 has an aperture 42 therethrough and the aperture 42 is positioned to be aligned with the vent passage or bore 22 through the respective valve cage member and in the illustrated structure, the aperture 42 is concentric with the outer ring 39. It is important to note that the aperture 42 has a smaller diameter than the vent passage 22 whereby differential pressure will deflect the movable portion 40 or seat the movable portion 40 on seating movement or opening movement of the head portion 36 respectively.

As best seen in FIGS. 2 to 5 inclusive, the first and second decks 8 and 9 are each illustrated as cylindrical members and the spacer member 10 is illustrated as a cylindrical member having opposite ends thereof engaging the valve cage member 12 of the first deck 8 and the valve seat member 15 of the second deck 9 respectively to thereby form a generally cylindrical discharge valve assembly 5. The valve seat member and valve cage member in each of the decks are planar members and have facing surfaces thereof in engagement adjacent the outer peripheral edges thereof. The valve cage member 12 of the first deck 8 and the valve seat member 15 of the second deck 9 are in spaced-apart and facing relation with the spacer member 10 mounted therebetween.

The spacer member 10 has an outer cylindrical wall member 43 having a plurality of circumferentially spaced ports 44 therethrough. A hood portion 45 extends inwardly from the outer cylindrical wall member 43 and has an inner peripheral edge portion 46 sealingly engaging the valve cage 12 of the first deck 8 to thereby define the interior and exterior passages 17 and 18. In the illustrated structure, the hood portion 45 is an arcuate member extending inwardly from the wall member 43 adjacent the second deck 9 to thereby direct the fluid from the interior passage 17 into all of the fluid-flow passages through the second deck 9 and to direct the fluid from the exterior passage 18 into the discharge passage 7 of the fluid-moving structure 1.

The valve cage member 12 of the first deck 8 and the valve seat member 15 of the second deck 9 have facing recesses 47 and 48 respectively in an exterior peripheral surface thereof to receive the respective opposite ends of the outer cylindrical wall member 43 of the spacer member 10. The valve cage member 12 of the first deck 8 also has a recess 49 in the inner peripheral surface of the inner ring 25 defining the central bore 14 thereof to receive the inner peripheral edge portion 46 of the hood portion 45.

The exterior peripheral surface of the valve seat member 11 of the first deck 8 and the valve cage member 16 of the second deck 9 have recesses 50 and 51 respectively therein which are substantially identical to the recesses 47 and 48 respectively to engage mounting portions of the fluid-moving structure 1 and the valve seat member 11 of the first deck 8 has a recess 52 in inner peripheral surface of the central bore 13 to receive the inner peripheral edge portion 46 of the hook portion 45 whereby the first and second decks 8 and 9 are reversible and can therefore be arranged as both an intake valve 5 and an exhaust or discharge valve 6, as best seen in FIGS. 2 and 7.

It is necessary that the mouth or valve seat of the ports 19 be in precise alignment with the respective guide bore or cylindrical recess 20 for the head portion 36 of the poppet valve member 34 to seat properly on and to properly close the respective circular port 19 controlled thereby. Therefore, suitable aligning means, illustrated as dowel pins 53, are adapted to be received within aligned recesses in the facing surfaces of the valve seat member and valve cage member in each of the decks.

Since the springs 37 of the valve members in the second deck 9 tend to separate the seat member 15 and the cage member 16 thereof, it is necessary to secure the valve seat member 15 and the valve cage member 16 of the second deck 9 together, therefore, suitable fastening members, such as screws 54, are mounted in the valve cage member 16 and are threadedly received in the valve seat member 15.

It is also necessary to secure the first deck 8 in spaced relation with the second deck 9 with the spacer member 10 therebetween. Therefore, in the illustrated structure, a through bolt 55 extends through the valve assembly to hold the first and second decks 8 and 9 in clamping engagement with the spacer member 10. The valve seat member 11 and the valve cage member 12 of the first deck 8 have ribs 56 and 57 respectively extending diametrically across the central bores 13 and 14. The ribs 56 and 57 of the valve seat member 11 and valve cage member 12 each have a bore 58 therethrough to permit one end of the through bolt 55 to extend therethrough. The one end of the bolt 55 is threaded to receive a suitable fastening device, such as a nut 59 to thereby pull the valve seat member 11 and valve case member 12 of the first deck 8 into engagement and with the rib 57 of the cage member 12 engaging one end of an enlarged intermediate portion 60 of the bolt 55 thereby compressing the springs 37 in the poppet valve members 34 in the first deck 8. The other end of the through bolt 55 is also threaded to receive a suitable fastening device, such as a nut 61, which when tightened, secures the first and second decks 8 and 9 in clamping engagement with the spacer member 10 and to hold the seat member 15 of the second deck 9 in engagement with the other end of the enlarged intermediate portion 60 of the through bolt 55.

It is desirable that the valve assembly be fluidtight except for flow through the respective valve cage members 12 or 16 therefore, suitable sealing members are positioned at critical locations within the valve structure. In the illustrated structure, an O-ring 62 is mounted in a notch 63 in the recess 47 in the valve cage member 12 and an O-ring 64 is mounted in a notch 65 in the recess 48 in the valve seat member 15 to thereby seal opposite ends of the outer cylindrical wall member 43. An O-ring 66 is mounted in the recess 49 in the central bore 14 of the valve cage member 12 to seal the inner peripheral edge portion 46 of the hood portion 45 when the spacer member 10 is held in clamping engagement between the first and second decks 8 and 9. Notches 67 and 68 are formed in the recesses 50 and 51 of the valve seat member 11 and the valve cage member 16 respectively to receive suitable O-rings (not shown) to sealingly engage suitable mounting portions of the fluid-moving structure 1. The recess 52 has a notch 69 therein to receive a suitable O-ring (not shown) when the first deck 8 is inverted for use in an intake valve assembly 5.

In order to assemble the discharge valve assembly the valve cage member 12 of the first deck 8 is placed on a suitable surface (not shown) and the dowel pins 53 are placed in their respective recesses. The wafer valve member 38 is then placed in the counterbore 23 and the springs 37 are placed in the guide bore or cylindrical recess 20. The poppet valve members 34 are sleeved on the springs 37 and the valve seat member 11 is mounted thereon using the dowel pins 53 to properly align same. The first deck 8 is then inverted and the O-rings 62 and 64 are placed in the recesses 47 and 48 and then the through bolt 55 is mounted in the bore 58 and the nut 59 is tightened until the facing surfaces of the seat member 11 and cage member 12 are held in clamping engagement with the intermediate portion 60 of the through bolt 55. The spacer member 10 is then mounted thereon. The second deck 9 is secured together in a similar fashion except that the screws 54 are mounted in the valve seal member 15 and the valve cage member 16 whereby the second deck 9 is placed as a unit on the outer cylindrical wall member 43 of the spacer member 10 and the nut 61 is tightened to secure the first and second decks 8 and 9 in clamping engagement with the spacer member 10 and with opposite ends of the intermediate portions 60 of the through bolt 55.

FIG. 7 illustrates the parts assembled as an intake valve assembly 5 wherein the first and second decks 8 and 9 are inverted and the valve seat member 11 is in facing relation with the valve cage member 16 and the spacer member 10 is held therebetween. The inner peripheral edge portion 46 of the hood portion 45 is received within the recess 52 and the opposite ends of the outer cylindrical wall member 43 are received in the recesses 50 and 51 respectively.

For the discharge valve assemblies 6, a portion of the fluid to flow therethrough enters the interior passage 17 through the central bores 13 and 14 in the first deck 8 and then flows through the second deck 9 by flowing through the circular ports 19 and between the ribs 31. The flow from the second deck 9 is collected in a bonnet 70 and flows through ports 71 therein and into the discharge passage 7 of the fluid-moving structure 1. The remaining portion of the fluid flows through the first deck 8 and into the exterior passage 18 and into the discharge passage 7 by flowing through the ports 44.

For the intake valve assemblies 5, a portion of the fluid from the intake passage 4 enters a bonnet 72 through ports 73 therein and flows through the inverted second deck 9 into the interior passage 17 and flows into the cylinder bore 2 through the central bores 13 and 14 in the first deck 8. The other portion of the fluid in the intake passage 4 enters the exterior passage 18 through the ports 44 and flows through the inverted first deck 8 into the cylinder bore 2 of the fluid-moving structure 1.

When it is desired to change the operating characteristics of a fluid-moving structure, particularly a fluid compressor the fluid clearance or the port area is changed by substituting valve structures having the desired flow characteristics. A double-deck-type valve may be installed to increase the clearance and thereby reduce the load on the compressor. When it is desired to keep the compressor loaded, the clearance may be decreased, as by using the second deck 9 alone, thereby providing the least clearance.

FIGS. 9 and 10 illustrate assembly of a plurality of the elements previously described to form a discharge valve assembly 75 and an intake or suction valve assembly 76 respectively of a double-deck-type valve formed using a pair of the first decks 8 in spaced-apart relation with the spacer member 10 therebetween. The double-deck valve has a central bore 77 through both of the first decks 8 and through the spacer member 10 and there would be only one circle or ring of cylindrical recesses 20 and poppet valve members 34 therein.

In the double-deck discharge valve assembly 75, a portion of the fluid would flow through the circular ports 19 in a lower deck, as seen in FIG. 9 and then out through the circumferentially spaced ports 44 in the spacer member 10 and the remaining portion of the fluid would flow through the central bore 77 of the lower deck to the top deck, as seen in FIG. 9, and then through the ports 19 in the upper deck and between the ribs 27 of the cage member 12 of the upper deck 8, as seen in FIG. 9. With the double-deck discharge valve assembly 75, it is necessary to provide a suitable fluid collection structure such as the bonnet 70, mounted in the respective fluid-moving structure to collect the fluid from the upper cage member 12 and direct same through the ports 71 of the bonnet 70 into the discharge passage 7 of the fluid-moving structure 1.

In the discharge valve assembly 75, it is necessary to prevent the fluid from flowing through the central bore 77 of the upper or top deck, as seen in FIG. 9, to thereby direct the fluid into the ports 19 of the upper deck, therefore, a closure member 78 is sealingly mounted in the recess 49 in the inner peripheral surface of the inner ring 25 of the valve cage member 12 of the upper deck 8, as seen in FIG. 9 to close the central bore 77. When it is desired to decrease the fluid clearance, the closure member 78 may be sealingly mounted in the recess 52 in the inner peripheral surface of the inner ring 25 of the valve seat member 11 of the upper deck 8, as seen in FIG. 9.

In the discharge valve assembly 75, the cage member 12 of the lower deck is spaced from and in facing relation with the seat member 11 of the upper deck and the bonnet 70 is mounted in the recess 47 of the cage member 12 of the upper deck, all as seen in FIG. 9.

In the double-deck intake valve assembly 76, a portion of the fluid would flow through the circular ports 19 in a lower deck as seen in FIG. 10, and then out through the central bore 77 of the upper deck, as seen in FIG. 10, and the remaining portion of the fluid would flow through the ports 44 in the spacer member 10 to the top deck, as seen in FIG. 10, ans then through the ports 19 in the upper deck and between the ribs 27 of the cage member 12 of the upper deck 8, as seen in FIG. 10. With the double-deck intake valve assembly 76, it is necessary to provide a suitable fluid collection structure, such as the bonnet 72, mounted in the respective fluid-moving structure to collect the fluid from the intake passage 4 and direct same toward the ports 19 in the lower deck 8 of the intake valve assembly 76.

In the intake valve assembly 76, it is necessary to prevent the fluid from flowing through the central bore 77 of the lower deck, as seen in FIG. 10, to thereby direct the fluid into the ports 19 of the lower deck, therefore, the closure member 78 is sealingly mounted in the recess 52 in the inner peripheral surface of the inner ring 25 of the valve seat member 11 of the lower deck 8, as seen in FIG. 10 to close the central bore 77. When it is desired to increase the fluid clearance, the closure member 78 may be sealingly mounted in the recess 49 in the inner peripheral surface of the inner ring 25 of the valve cage member 12 of the lower deck 8, as seen in FIG. 10.

In the intake valve assembly 76, the cage member 12 of the lower deck is spaced from and in facing relation with the seat member 11 of the upper deck and the bonnet 72 is mounted in the recess 50 of the seat member 11 of the lower deck, all as seen in FIG. 10.

It is to be understood that while we have illustrated and described certain forms of our invention, it is not to be limited to these specific forms or arrangement of parts herein described and shown.

What we claim and desire to secure by Letters Patent is:

1. A valve assembly for controlling flow of fluid under pressure comprising:
   a. a seat member having a plurality of unimpeded fluid-flow passages therethrough, each of said fluid-flow passages having a mouth at one face of said seat member to define a valve seat;
   b. a cage member having a guide bore therein for each valve seat of said seat member, each guide bore having a bottom in facing relation with said respective mouth, said cage member having fluid-flow passages between said guide bores, each guide bore having a vent passage through said cage member;
   c. means for securing said seat member and said cage member together;
   d. a valve member for each valve seat, said valve member having one portion engageable with said respective valve seat and another portion received within said respective guide bores for guiding said valve member during movement thereof;
   e. resilient means associated with each valve member for urging same into engagement with said respective valve seat;
   f. a wafer valve within each of said guide bores at said vent passages and having a movable portion to seat thereat for cushioning opening movement of said respective valve member, said movable portion being swingable in response to differential pressure to open said respective vent passages to effect positive seating of said respective valve member;
   g. said vent passages each being generally cylindrical passages;
   h. said wafer valves each having an annular outer ring positioned within said respective guide bores and said movable portion extends into the space defined by said outer ring from an inner peripheral edge thereof; and
   i. said movable portions each having an aperture therethrough and aligned with said respective vent passage, said aperture being of a smaller size than said respective vent passages whereby flow through said vent passage is reduced when said movable portion is seated thereby cushioning opening movement of said respective valve member and greater fluid pressure within said respective vent passage moves said movable portion to open said vent passage for full flow therethrough to effect positive seating of said respective valve member.

2. A valve assembly for controlling flow of fluid through a fluid compressor, said valve assembly comprising:
   A seat member having a plurality of unimpeded fluid-flow passages therethrough, each of said fluid-flow passages having a mouth at one face of said seat member to define a valve seat;
   b. a cage member having a guide bore therein for each valve seat of said seat member, each guide bore having a bottom in facing relation with said respective mouth, said cage member having a fluid-flow passages between said guide bores, each guide bore having a vent passage through said cage member;
   c. means for securing said seat member and said cage member together;
   d. a valve member for each valve seat, said valve member having one portion engageable with said respective valve seat and another portion received within said respective guide bore for guiding said valve member during movement thereof;
   e. resilient means associated with each valve member for urging same into engagement with said respective valve seat;
   f. a wafer valve within each of said guide bores at said vent passages and having a movable portion to seat thereat for cushioning opening movement of said respective valve member, said movable portion being swingable in response to differential pressure to open said respective vent passages to effect positive seating of said respective valve member;
   g. said cage member being a planar member having inner and outer portions, said cage member having a plurality of spaced guide members there being one guide member for each valve member;
   h. each guide bore and the respective vent passage being positioned within a guide member positioned between said inner and outer portions of said planar member; and
   i. said guide members being in spaced-apart relation and each guide member having integral ribs extending therefrom and connecting same to said inner and outer portions of said planar cage member to define said fluid-flow passages whereby fluid may flow between said ribs when said valve members are spaced from said respective valve seats.

3. A valve assembly for controlling flow of fluid through a fluid compressor, said valve assembly comprising:
   a. a first deck and a second deck each having a seat member and a cage member, said seat members each having a plurality of unimpeded fluid-flow passages therethrough, each of said fluid-flow passages having a mouth at one face of said seat member to define a valve seat, said cage members each having a guide bore therein for each valve seat of said respective seat member, said cage members each having fluid-flow passages between said guide bores;
   b. a spacer member between and in engagement with said first and second decks for positioning same in spaced apart relation and for controlling the direction of flow of fluid through said first and second decks;
   c. means for securing the valve assembly together with said spacer member between and in engagement with said first and second decks;
   d. a valve member for each valve seat, said valve member having a head portion engageable with said respective valve seat and a stem portion received within said respective guide bore for guiding said valve member; and
   e. resilient means associated with each valve member for urging same into engagement with said respective valve seat.

4. The valve assembly as set forth in claim 3 wherein:
   a. the seat member of one of said decks is spaced from and in facing relation with the cage member of the other of said decks with said spacer member therebetween; and
   b. said spacer member is shaped to receive a portion of the fluid to flow through the valve assembly and direct same through one of said decks and said spacer member is shaped to receive the other portion of the fluid after flowing through the other deck and direct same through the valve assembly.

5. The valve assembly as set forth in claim 3 wherein:
a. one of said decks has a central bore through said seat member and through said cage member thereof;
b. said spacer member is shaped to define an interior passage and an exterior passage therethrough;
c. said interior passage communicates said central bore through said one deck with said fluid-flow passages through said seat member and said cage member of said other deck; and
d. said exterior passage communicates said fluid-flow passages through said one deck with a portion of the fluid compressor.

6. The valve assembly as set forth in claim 5 wherein said spacer member includes:
a. an outer wall member sealingly engaging said first and second decks and having a plurality of spaced ports therethrough; and
b. a hood portion extending inwardly from said outer wall member and having an inner peripheral edge portion thereof sealingly engaging said one deck adjacent said central bore therethrough.

7. The valve assembly as set forth in claim 6 wherein:
a. said seat member and said cage member of said first deck and said second deck each have a substantially similar recess in an outer peripheral edge thereof, each of said recesses in the outer peripheral edges of said seat members and said cage members being shaped to receive said outer wall member therein; and
b. said seat member and said cage member of said one deck having said central bore therethrough each have a substantially similar recess in an inner peripheral edge thereof, each of said recesses in the inner peripheral edge of said seat member and said cage member of said one deck being shaped to receive said inner peripheral edge portion of said hood portion whereby said first and second decks and said spacer member may be selectively arranged to form intake valves and to form discharge valves.

8. The valve assembly as set forth in claim 7 wherein:
a. said inner peripheral edge portion is received in said respective recess of said cage member of said one deck having said central bore therethrough and said seat member of said other deck is spaced from and in facing relation with said cage member of said one deck to form a discharge valve assembly; and
b. said inner peripheral edge portion is received in said respective recess of said seat member of said one deck having said central bore therethrough and said cage member of said other deck is spaced from and in facing relation with said seat member of said one deck to form an intake valve assembly.

9. The valve assembly as set forth in claim 3 including:
a. a vent passage for each guide bore, said vent passage extending through said respective cage member; and
b. a wafer valve within each of said guide bores at said vent passage and having a movable portion to seat thereat for cushioning movement of said respective valve member, said movable portion being swingable in response to differential pressure to open said respective vent passage to effect positive seating of said respective valve member.

10. The valve assembly as set forth in claim 3 wherein:
a. said first and second decks each have a central bore through said seat member and said cage member thereof;
b. said spacer member is shaped to define an interior passage and an exterior passage therethrough;
c. said interior passage communicates said central bore through one of said decks with said fluid-flow passages through the other of said decks;
d. said exterior passage communicates the fluid-flow passages through said one deck with a portion of the fluid compressor; and
e. said other deck has a closure member sealingly mounted in the central bore therethrough to close same whereby fluid is directed through the fluid-flow passages of said other deck.

11. The valve assembly as set forth in claim 10 wherein:
a. said cage member of said one deck is spaced from and in facing relation with the seat member of the other deck to form a discharge valve assembly; and
b. said seat member of said one deck is spaced from and in facing relation with the cage member of the other deck to form an intake valve assembly.